United States Patent Office 2,741,350
Patented Apr. 10, 1956

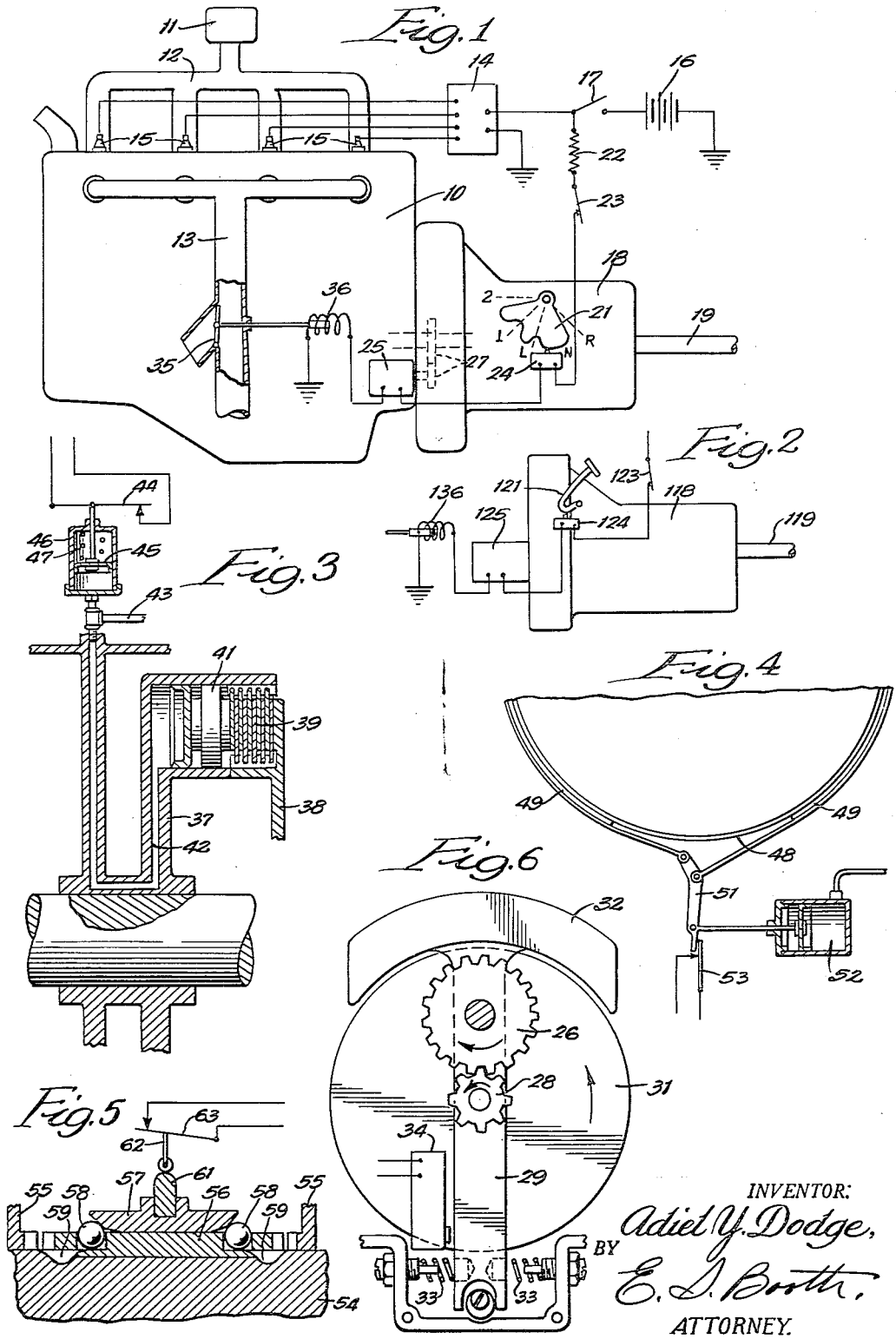

2,741,350
CONTROL SYSTEMS FOR ENGINE DRIVEN VEHICLES

Adiel Y. Dodge, Rockford, Ill.

Application February 28, 1952, Serial No. 274,019

12 Claims. (Cl. 192—.092)

This invention relates to control systems for engine driven vehicles and more particularly to systems to facilitate shifting of the transmissions of vehicles from one driving condition to another; and particularly to facilitate shifting without changing the throttle setting of the engine.

In shifting the transmissions of automotive vehicles, there is usually an interval during the shift when the driving connections through the transmission are interrupted. In conventional manual shifting this may be due to disengagement of a fraction clutch while in many types of automatic transmissions it is due to disengagement of a clutch or brake and in the interval before the the engagement of the necessary clutches or brakes to effect the next desired ratio. In either case the engine is temporarily unloaded and tends to increase rapidly in speed thereby making the shift more difficult to accomplish and caushing a substantial shock upon completion of the shift.

Certain types of automatically shifted transmissions have attempted to overcome this difficulty by simultaneously engaging clutches or brakes for two different ratios for a brief interval during shifting. This operation tends to lock the transmission, thereby throwing a heavy strain on the parts and producing an uncomfortable shock to the vehicle.

The present invention is based on the premise that shifting of the transmission will be facilitated and shock will be minimized if not eliminated by limiting acceleration to prevent racing of the engine at times when the driving connections through the transmission are interrupted. Thus during shifting the engine is held at substantially constant speed so that the shift, whether manual or automatic, can be completed easily and the transmission will pick up the load in its new ratio with a minimum shock.

It is therefore one of the objects of the present invention to provide a control system in which the engine of a vehicle will be prevented from accelerating excessively when the driving connections through the vehicle transmission are interrupted.

Another object is to provide a control system in which an acceleration governor driven by the engine cooperates with control means for the transmission to disable the engine if it tends to accelerate excessively when the driving connections through the transmission are interrupted.

According to one feature the acceleration governor and the transmission control means operate electric switches which are connected in series to the engine ignition system to interrupt the engine ignition when both switches are closed.

According to another feature the engine exhaust pipe is provided with a bypass valve which is opened by the control means when the engine is disabled to prevent any possible damage to the exhaust system and the muffler due to backfiring.

The above and other objects and advantages of the invention will be more readily apparent when viewed in connection with the accompanying drawings in which:

Figure 1 is a diagrammatic view of a vehicle power plant equipped with a control embodying the invention;

Figure 2 is a partial diagrammatic view similar to Figure 1 showing an alternative arrangement;

Figure 3 is a diagrammatic sectional view through a hydraulically controlled clutch illustrating a type of control according to the invention;

Figure 4 is a similar view illustrating a control according to the invention as applied to a band type brake;

Figure 5 is a sectional view illustrating the application of a control according to the invention to a positive shifting clutch and Figure 6 is an elevation showing an acceleration governor of a type which can be used in the control of the invention.

As shown in Figure 1 a more or less conventional type of vehicle power plant to which the invention may be applied comprises an internal combustion engine 10 supplied with a fuel through a carburetor 11 and intake manifold 12 and having an exhaust pipe 13. The engine includes an ignition system comprising a spark coil timer and distributor illustrated diagrammatically at 14 which supplies voltage in proper sequence to a series of spark plugs 15 in the cylinders of the engine. The coil 14 may be energized by a battery 16 through a main ignition switch 17.

The engine transmits power to the wheels through a transmission mechanism indicated generally at 18, which drives a propeller shaft 19 connected to the vehicle wheels through the usual differential. The transmission 18 may be any conventional type of transmission embodying shiftable elements such as shiftable gears or clutches or friction clutches or brakes to produce any one of a series of driving conditions. For example, the transmission as shown may provide a reverse and a plurality of forward ratios and a neutral and may be shifted into any one of these positions by the movable control member 21. When the transmission is shifted, the control member will be turned to a point where the line corresponding to the selected ratio as indicated by R, N, L, 1, and 2, extends downward.

In shifting transmissions of this type whether the shift is accomplished manually or automatically the engine tends to be unloaded and as the transmission passes through a neutral condition between the different driving ratios so that unless the accelerator pedal is carefully controlled the engine tends to race. This makes shifting difficult and upon completion of the shift causes a severe shock on the entire power plant and on the occupants of the vehicle. To avoid this shifting difficulty and shock according to the present invention acceleration of the engine when the transmission mechanism is in a neutral condition is limited.

According to one way to accomplish this purpose as shown in Figure 1 a short circuit for the ignition system is provided including a current limiting resistor 22, a manual cut-out switch 23, an automatic switch 24 operated by the transmission and acceleration governor 25. The switch 24 may be a button operated type switch as shown with the operating button thereon positioned to engage the periphery of the shifting member 21 which is preferably cam shaped to control the switch. The switch 24 is normally open and is closed when the operating button thereof is depressed by a cam surface on the member 21. The periphery of this member is so shaped as shown that the switch will be closed when ever the transmission is in a neutral position, either the main neutral or the neutral between ranges and will be opened by disengagement of the cam member with its operating button whenever the transmission is in one of its driving conditions.

The acceleration governor as best seen in Figure 6 may be constructed as more particularly described and claimed in my copending application Serial No. 119,510 filed December 6, 1950. As shown, this governor comprises a driving gear 26 which is connected to the engine to be driven thereby as illustrated by the dotted line gearing 27 in Figure 1. The driving gear meshes with a pinion 28 mounted on an arm 29 is pivoted on the axis of the driving gear 26 and pinion 28 is connected to a fly wheel 31 to drive it. The upper end of the arm 29 may carry a counterbalance weight 32 and its lower end is normally centered by light springs 33. Movement of the arm 29 in a clockwise direction in response to acceleration of the engine and the driving gear 26 will close the switch 34 which is connected in series with the switch 24.

According to a further feature of the invention short circuiting of the ignition circuit is accompanied by opening of a by-pass valve 35 in the exhaust pipe 13 to prevent any possible damage to the muffler due to a backfiring of the engine caused by accumulation of unburned gas in the exhaust pipe when the ignition is interrupted. The valve 35 is normally held closed by a spring not shown and is adapted to be opened by a coil 36 connected in series with the switches 24 and 34 as shown.

When the engine is operating normally in one of its driving gear ratios, the switch 24 will be open and any closing of the switch 34 by the acceleration governor will produce no effect. However, when the transmission is being shifted and is in one of its neutral positions the switch 24 will be closed. If the engine tends to accelerate at this time due to unloading thereof the acceleration governor 25 will close its switch 34 to complete a circuit through the limiting resistor 22, the closed manual switch 23, the switches 24 and 34 and the coil 36. This circuit shunts the ignition circuit to disable the engine temporarily during the period that both switches are closed. It will be noted that the ignition will be interrupted for only very brief periods since as soon as the engine is disabled it will stop accelerating and the switch 34 will immediately open to interrupt the shunt circuit and reestablish ignition. Simultaneous closing of both switches 24 and 34 will also open the bypass valve 35 in the exhaust pipe so that if any backfiring should occur the gasses will discharge harmlessly from the bypass without any possibility of damaging the muffler. If it is desired to be able to accelerate the engine in the neutral position of the transmission for example in working on the engine, the switch 23 may be opened to enable the engine to be accelerated freely as desired.

Figure 3 illustrates a type of hydraulically operated brake commonly used in many transmissions and particularly in automatically controlled transmissions. This brake, as shown is adapted to connect a fixed part 37 to a part 38 which is rotatable thereto. The brake comprises a series of discs 39 alternately splined to the parts 37 and 38 and which are adapted to be pressed into engagement by a piston 31 fitting into a cylindrical port in the part 37. Operating fluid is supplied to the piston through a passage 42 in the part 37 which is connected to a fluid supply conduit 43 leading from any desired pressure source. When pressure is applied through the conduit 43 the brake discs will be pressed together to connect the parts 37 and 38 and when there is no pressure supplied the discs will separate to disconnect parts 37 and 38. The pressure supplied through the pipe 43 is utilized to control a switch 44 which is connected to a piston 45 in a cylinder 46 communicating with the pipe 43. The piston 45 is urged downward by a spring 47 to close the switch 44 when no pressure is present in the pipe 43 and the brake is disengaged corresponding to a neutral driving condition. When pressure is supplied to engage the brake the same pressure will urge the piston 45 upward to open the switch 44. It will be understood that the switch 44, or a plurality of such switches, connected in parallel, may correspond to the switch 24 shown in Figure 1.

Figure 4 illustrates a band brake type control used in many transmissions wherein a rotatable drum member 48 is gripped by a flexible friction band 49 to hold it against rotation thereby to establish a driving condition. The brake band 49 is controlled by a lever 51 which is turned clockwise by a fluid motor 52 to engage the brake and which swings counterclockwise to release the brake. A switch 53 is mounted adjacent the lever 51 to be engaged thereby. The switch is normally closed as shown and is engaged by the lever 51 when it moves counterclockwise to release the brake to be opened. Therefore when the brake is released to establish a neutral condition the switch 53 is open and when the brake is engaged to establish a driving condition, the switch 53 will be closed. It will be understood that the switch 53 or a plurality of such switches connected in parallel with each other or with switches such as the switch 44 may correspond to the switch 24 in the diagram of Figure 1, so that the ignition will be shut off if the torque transmission is interrupted in any one of two or more places.

Figure 5 shows still another shifting arrangement in which different transmission parts may be connected through positive tooth clutches to establish different driving conditions, the clutch mechanism being of the type more particularly described and claimed in my copending application Serial No. 213,141, filed February 28, 1951. In this construction a shaft indicated at 54 is adapted to be connected to one or the other of a pair of members 55 which are freely rotatable on the shaft. The connection is effected through a sleeve 56 slidably splined on the shaft and controlled by a shift collar 57 which is slidable and rotatable on the sleeve. The collar 57 terminates at its ends in outwardly flaring cammed surfaces which engage actuating and locking balls 58 which are slidable in openings through the sleeve 56. The balls 58 can move into recesses 59 in the shaft to lock the sleeve in its shifted position. The ends of the sleeve are formed with clutch teeth which are shaped to engage with complementary clutch teeth on the members 55 to connect the sleeve and the shaft 54 with either of the members 55 as desired. Thus, when the collar 57 is shifted to the left for example it will act through the balls 58 to move the sleeve to the left and engage the clutch teeth at the left end of the sleeve with the left end member 55. As the balls 58 move into the recesses 59 the collar 57 will slide partially over the balls to hold them in place in response to a relatively small force on the collar thereby to hold the clutch teeth locked together. The collar 57 carries a cam projection 61 engaging a switch operating rod 62 which is connected to a switch 63 to operate the switch in response to the shifted position of the collar. The switch 63 is normally open but is engaged by the cam member 61 to be closed when the collar is in its neutral position as shown to disconnect the shaft 54 from both of the members 55. It will be understood that the switch 63 may correspond to the switch 24 of Figure 1.

In transmissions utilizing a conventional friction clutch and which are manually shifted, a control as shown in Figure 2 may be employed, parts in this figure corresponding to like parts in Figure 1 being indicated by the same reference numerals plus 100. In this construction the transmission includes adjacent to the left end thereof a conventional fly-wheel and friction clutch and is provided with a pivotally mounted pedal 121 to operate the clutch. When the pedal is depressed as shown in Figure 2 the clutch will be disengaged to interrupt torque transmission through the transmission mechanism corresponding to a neutral condition and when the pedal is released it will rise and allow the clutch to engage in response to the usual clutch spring.

The switch 124 is mounted adjacent to the clutch pedal to be engaged and closed thereby when the pedal is depressed to disengage the clutch. When the pedal is released it will disengage the switch operating button so that the switch will open. During shifting in vehicles of this type the clutch is depressed while the shift is being made and at this time the switch 124 will be closed so that if the engine tends to accelerate the acceleration governor 128 will close its switch and disable the ignition.

Therefore the engine is prevented from racing during shifting so that the shift is accomplished easily and smoothly.

While several embodiments of the invention have been shown and described herein, it will be understood that these are illustrative only and not to be taken as a definition of the scope of the invention, reference being had for this purpose to the appended claims.

What is claimed is:

1. In a vehicle having an engine including control means whose operation is essential to operation of the engine and power transmission means driven by the engine and including a part shiftable to one position to establish transmission of power and to a second position to interrupt transmission of power, a control system comprising an acceleration governor connected to the engine to be driven thereby, a control device connected to the governor to be operated thereby in response to acceleration of the engine, a second control device operated by said part when it is in its second position, and connections between the control devices and the control means to disable normal operation of the control means and thereby limit acceleration of the engine when both of the control devices are operated simultaneously.

2. In a vehicle having an engine including control means whose operation is essential to operation of the engine and power transmission means driven by the engine and including a part shiftable to one position to establish transmission of power and to a second position to interrupt transmission of power, a control system comprising an acceleration governor connected to the engine to be driven thereby, a control device connected to the governor to be operated thereby in response to acceleration of the engine, a second control device operated by said part when it is in its second position, the engine having an exhaust pipe with a normally closed by-pass valve therein, means actuated in response to simultaneous operation of both of the control devices to open the by-pass valve, and connections between the control devices and the control means to disable normal operation of the control means and thereby limit acceleration of the engine when both of the control devices are operated simultaneously.

3. In a vehicle having an engine including an ignition system and power transmission means driven by the engine and including a part shiftable to one position to establish transmission of power and to a second position to interrupt transmission of power, control means comprising an acceleration governor connected to the engine to be driven thereby, an electrical switch connected to the governor to be operated thereby in response to acceleration of the engine, a second normally open electric switch operatively connected to said part to be operated thereby, and a circuit connecting said switches in series with the ignition system of the engine to disable the engine when both of the switches are operated.

4. In a vehicle having a driving engine including control means whose operation is essential to operation of the engine, a transmission driven by the engine and including control parts operable to establish neutral condition or any one of a plurality of driving conditions, and operating means for the control parts, a control system comprising an acceleration governor connected to the engine to be driven thereby, a control device operated by the governor in response to acceleration of the engine, a second control device operatively connected to said operating means to be operated thereby when the operating means shifts the control parts to establish a neutral condition of the transmission, and connections between the control devices and the control means to disable normal operation of the control means and thereby limit acceleration of the engine when both of the control devices are operated simultaneously.

5. The combination of claim 4 in which the control means comprises an ignition system for the engine and the control devices are electric switches connected in series with each other to the ignition system of the engine to disable the ignition system when all of the switches are moved to one position.

6. The construction of claim 4 in which the engine has an exhaust pipe with a by-pass valve therein and means responsive to simultaneous operation of both of the control devices to open the by-pass valve.

7. In a vehicle having an engine including control means whose operation is essential to operation of the engine, a transmission driven by the engine and shiftable to a plurality of driving positions and to neutral position, and shifting means for the transmission movable to shift the transmission to any selected one of said positions, a control system comprising a cam movable with the shifting means, a control device operated by the cam when the shifting means is in a position to shift the transmission to neutral, an acceleration governor connected to the engine to be driven thereby, a control device connected to the acceleration governor to be operated thereby in response to acceleration of the engine, and connections between the control devices and the control means to disable normal operation of the control means and thereby limit acceleration of the engine when both of the control devices are operated simultaneously.

8. The construction of claim 7 in which the engine includes an exhaust pipe having a by-pass valve therein and means are provided connected to the control devices and operated in response to simultaneous operation thereof to open the by-pass valve.

9. The construction of claim 7 in which the control means comprises an ignition system for the engine and the control devices are electric switches connected in series with each other to the ignition system to disable the ignition system when both of the switches are closed.

10. In a vehicle having an engine including control means whose operation is essential to operation of the engine, a transmission, a friction clutch connecting the engine to the transmission, and operating means for the clutch movable to one position to engage the clutch and to a second position to disengage the clutch, a control system comprising an acceleration governor connected to the engine to be driven thereby, a control device connected to the governor to be operated thereby in response to acceleration of the engine, a second control device connected to the operating means for the clutch to be operated thereby when the operating means is in its second position, and connections between the control devices and the control means to disable normal operation of the control means and thereby limit acceleration of the engine when both of the control devices are operated simultaneously.

11. The construction of claim 10 in which the control means comprises an ignition system for the engine and the control devices are electric switches connected in series with each other to the ignition system to disable the ignition system when both of the switches are closed.

12. The construction of claim 11 in which the engine includes an exhaust pipe having a by-pass valve therein and an electrical device is electrically connected to the switches and mechanically connected to the by-pass valve to open the by-pass valve when both of the switches are closed.

References Cited in the file of this patent

UNITED STATES PATENTS

| | | |
|---|---|---|
| 1,186,588 | Lemon | June 13, 1916 |
| 1,588,422 | Howell | June 15, 1926 |
| 1,828,650 | Duer et al. | Oct. 20, 1931 |
| 1,848,698 | Curtis | Mar. 8, 1932 |
| 2,620,680 | Forman | Dec. 9, 1952 |

FOREIGN PATENTS

| | | |
|---|---|---|
| 251,748 | Great Britain | May 13, 1926 |
| 588,420 | Germany | Nov. 18, 1933 |